3,134,775
NEW PESTICIDAL TRIAZINE DERIVATIVES
Arthur John Floyd, Bracknell, England, assignor to Imperial Chemical Industries Limited, London, England, a corporation of Great Britain
No Drawing. Filed Apr. 29, 1960, Ser. No. 25,563
Claims priority, application Great Britain May 15, 1959
7 Claims. (Cl. 260—249.9)

This invention relates to s-triazine derivatives and their acid addition salts and to pesticidal compositions containing them. The invention is a modification of the invention described in Serial No. 764,498, filed on October 1, 1958.

The abovementioned Serial No. 764,498 describes and claims s-triazine derivatives of the formula:

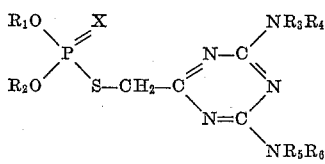

in which $R_1$ and $R_2$ are methyl or ethyl radicals; $R_3$, $R_4$, $R_5$ and $R_6$, which can be the same or different, are each a hydrogen atom or a methyl, ethyl, propyl or butyl radical, or $R_3$ and $R_4$, or $R_5$ and $R_6$, together with their adjacent nitrogen atom, constitute a piperidino ring; and X is an atom of oxygen or sulphur; and acid addition salts thereof. These compounds possess aphicidal properties.

We have now found that a number of related s-triazine derivatives and their acid addition salts also possess valuable aphicidal activity and, moreover, some have marked acaricidal activity.

Accordingly, the present invention provides new s-triazine derivatives of the formula:

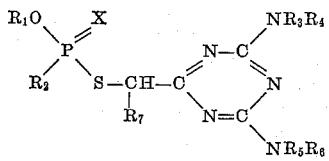

in which $R_1$ and $R_2$ are methyl or ethyl radicals; $R_3$, $R_4$, $R_5$, $R_6$ and $R_7$, which can be the same or different, are each a hydrogen atom or a methyl, ethyl, propyl or butyl radical; or $R_3$ and $R_4$, or $R_5$ and $R_6$, together with their adjacent nitrogen atom constitute a piperidino ring; and X is an oxygen or sulphur atom; and acid addition salts thereof.

Compounds which in particular have been found to possess useful pesticidal activity are those in which the groups $R_3$, $R_4$, $R_5$ and $R_6$ together have a total number of carbon atoms not exceeding six. Furthermore, preferred compounds of this invention are those in which at least one of $R_3$, $R_4$, $R_5$ and $R_6$ is a hydrogen atom, and especially where $R_3$ and $R_4$, or $R_5$ and $R_6$ are both hydrogen atoms. The group $R_7$ is preferably a hydrogen atom or a methyl radical.

The acid addition salts of the present invention, can be salts derived from an inorganic acid, for example hydrochlorides, or from an organic acid, for example picrates.

The invention also includes a process for the preparation of s-triazine derivatives, in which an alkyl alkylphosphonothiolic acid derivative of the formula:

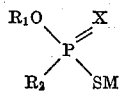

is reacted with a compound of the formula:

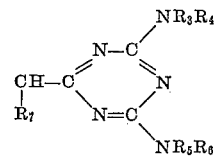

in which $R_1$, $R_2$, $R_3$, $R_4$, $R_5$, $R_6$, $R_7$ and X have the meanings given to them above; M is an atom of an alkali metal or an ammonium radical; and Y is a halogen atom.

The process is preferably performed within the temperature range 20–150° C. though the temperature chosen naturally depends to a large extent upon the reactivity of the reactants. Preferably the reactants are in solution or dispersion, in for example a lower alcohol such as methanol or ethanol.

The alkyl alkylphosphonothiolic acid derivative used as starting material in the process of this invention can be obtained from a suitable 0:0'-dialkylthiophosphite and a suitable alkyl halide by the method of M. I. Kabachnik et al., Doklady Acad. Nauk, U.S.S.R., 1955, 104, 861.

The invention also includes pesticidal compositions containing as active ingredient, an s-triazine derivative of the invention or an acid addition salt thereof, in admixture with a suitable diluent or carrier. The pesticidal composition can, for example, be a liquid composition in which the active ingredient is dissolved or dispersed in a suitable liquid medium, or it can be a powder composition.

The compounds of the invention have only low solubility in water but are in general sufficiently soluble to enable aqueous solutions of low pesticidal concentrations to be prepared. However, in order to facilitate the preparation of aqueous solutions, especially where higher pesticidal concentrations are required, it has been found advantageous to dissolve the compound initially in a small quantity of a water-miscible organic solvent such as methanol, tetrahydrofurfuryl alcohol, diacetone alcohol or β-ethoxyethanol, and to dilute the resulting organic solution with sufficient water to obtain the desired aqueous solution.

Where the pesticidal composition of the invention is a powder composition, the active ingredient can be in admixture with an inert powder diluent, for example fuller's earth, talc, kaolin, kieselguhr or bentonite. If desired, the pesticidal compositions, whether liquid or solid, can contain a suitable wetting or dispersing agent or other suitable auxiliary agent known in the art as being useful in pesticidal compositions. The powder pesticidal compositions referred to above can be used as seed dressings for the treatment of seed in order to provide protection for plants subsequently grown from the seed against attack by aphids or phytophagous mites.

The invention also includes a method of combating aphids or phytophagous mites, in which the aphids or mites, or plants susceptible to attack by said aphids or mites are treated with a compound or a pesticidal composition of this invention.

The invention is illustrated by the following examples in which (except where otherwise stated) the parts referred to are parts by weight.

Examples 1–6 describe the preparation of a variety of s-triazine compounds and acid addition salts of this invention, and Examples 7–13 describe pesticidal compositions containing, as their active ingredients, compounds of Examples 1–6.

EXAMPLE 1

This example describes the preparation of 2-ethoxy(methyl)phosphinylthiomethyl - 4:6 - diamino-s-triazine, and its hydrochloride.

Ethyl methylphosphonothiolic acid (6.7 parts) was added slowly to a solution of sodium (1.1 parts) dissolved in absoluate ethanol (40 parts). To the resultant solution was added 2:4-diamino - 6 - chloromethyl-s-triazine (7.7 parts) and the mixture was heated under reflux for 6 hours, allowed to stand overnight and filtered. The solid obtained was stirred with water (200 parts), filtered, and the solid washed with water, and dried. There was thus obtained the base 2-ethoxy(methyl)phosphinylthiomethyl - 4:6 - diamino-s-triazine, M.Pt. 189–92° C., which was recrystallised from a mixture of β-ethoxyethanol and water to give a purer product, M.Pt. 204–6° C.

The hydrochloride of the base was made by addition of excess hydrogen chloride in ethanolic solution to a suspension of the base in about ten times its weight of dry ethanol. The clear solution thus obtained slowly deposited crystals of the hydrochloride which were collected and recrystallised from ethanol, M.Pt. 169–70° C. with decomposition.

EXAMPLE 2

This example describes the preparation of 2-α-ethoxy-(methyl)phosphinylthioethyl-4:6-diamino-s-triazine.

Ethyl methylphosphonothiolic acid (18 parts) was added slowly to a solution of sodium (3 parts) in absolute ethanol (400 parts). To the resultant solution was added 2:4-diamino-6-α-bromoethyl-s-triazine (21.4 parts) and the mixture was heated under reflux for 3 hours. The ethanol was then removed by distillation under reduced pressure, the residue stirred with water (400 parts), filtered, and the insoluble product remaining was washed with water. By recrystallisation from ethanol there was obtained 2-α-ethoxy(methyl)phosphinylthioethyl - 4:6-diamino-s-triazine, M.Pt. 186–8° C.

EXAMPLE 3

This example describes the preparation of 2-ethoxy-(methyl)phosphinylthiomethyl - 4-amino-6-methylamino-s-triazine.

Ethyl methylphosphonothiolic acid (4.2 parts) was added slowly to a solution of sodium (0.7 part) in absolute ethanol (80 parts). To this solution was added 2-amino-4-methylamino - 6 - chloromethyl-s-triazine (5.2 parts) and the mixture was heated under reflux for 3 hours, filtered while hot to remove deposited sodium chloride and the filtrate obtained evaporated to dryness under reduced pressure yielding a yellow gum. By trituration with ethanol a crystalline mass was obtained, which was recrystallised from ethanol to give 2-ethoxy-(methyl)phosphinylthiomethyl - 4-amino-6-methylamino-s-triazine, M.Pt. 162–3° C.

EXAMPLE 4

This example describes the preparation of 2-ethoxy-(methyl)phosphinylthiomethyl - 4 - amino-6-dimethylamino-s-triazine.

Ethyl methylphosphonothiolic acid (4.8 parts) was added slowly to a solution of sodium (0.8 part) in absolute ethanol (40 parts). To the resulting solution was added 2-amino-4-dimethylamino-6-chloromethyl-s-triazine (6.4 parts) and the mixture was heated under reflux for 5 hours, filtered while hot to remove deposited sodium chloride and cooled, thereby yielding colourless crystals of 2-ethoxy(methyl)phosphinylthiomethyl - 4-amino-6-dimethylamino-s-triazine, which were recrystallised from ethanol as a solid of M.Pt. 143–5° C.

EXAMPLE 5

This example describes the preparation of 2-ethoxy-(methyl)phosphinylthiomethyl - 4:6 - bismethylamino-s-triazine.

Ethyl methylphosphonothiolic acid (4.2 parts) was added slowly to a solution of sodium (0.7 part) in absolute ethanol (40 parts). To the resulting solution was added 2:4-bismethylamino-6-chloromethyl-s-triazine (5.5 parts) and the mixture was heated under reflux for 2½ hours, cooled to room temperature and filtered; and the filtrate so obtained evaporated to dryness under reduced pressure. The resultant oil was dissolved in chloroform (150 parts), washed three times with water and dried over anhydrous magnesium sulphate. The chloroform was then removed by distillation under reduced pressure leaving a gum which crystallised on standing. This product was recrystallised from ethyl acetate giving 2-ethoxy-(methyl)phosphinylthiomethyl - 4:6 - bismethylamino-s-triazine, M.Pt. 115–7° C.

EXAMPLE 6

This example describes the preparation of 2-ethoxy-(methyl)phosphinylthiomethyl - 4 - amino-6-piperidino-s-triazine and its picrate.

Ethyl methylphosphonothiolic acid (4.8 parts) was added slowly to a solution of sodium (0.8 part) in absolute ethanol (40 parts). To the resulting solution was added 2-amino-4-piperidino-6-chloromethyl-s-triazine (7.7 parts) and the mixture was heated under reflux for 3 hours, filtered while hot to remove sodium chloride and the filtrate obtained evaporated to dryness under reduced pressure yielding the base 2-ethoxy(methyl)phosphinylthiomethyl-4-amino-6-piperidino-s-triazine as a colourless gum.

The picrate of the base was made by addition of excess picric acid dissolved in ethanol to a solution of the base in ethanol, the picrate being deposited as yellow crystals, which were recrystallised from ethanol giving a solid, M.Pt. 154–6° C.

EXAMPLE 7

This example describes a pesticidal composition containing as active ingredient the base obtained by the process of Example 1 above.

The base (16 parts) was dissolved in tetrahydrofurfuryl alcohol (1,000 parts) and the resulting solution mixed with water (99,000 parts) containing 0.05% of a wetting agent consisting of a condensation product of octyl cresol with 8–10 molecular proportions of ethylene oxide. There was thus obtained a pesticidal composition suitable for use as an agricultural spray. The composition was sprayed upon broad bean plants infested with *Macrosiphum pisi*, and 2 days after spraying it was found that 100% kill had been obtained. In a second test, the composition was sprayed upon French bean plants infested with red spider mites (*Tetranychus telarius*), and 3 days after spraying it was found that 100% kill had been obtained. In the above tests the composition showed no phytotoxic properties.

EXAMPLE 8

The hydrochloride of Example 1 above (16 parts) was dissolved in water (100,000 parts) containing 0.05% of the wetting agent of Example 7. The pesticidal composition thus obtained when sprayed on French bean plants infested with red spider mites (*T. telarius*) gave 100% kill after 3 days and showed no phytotoxic properties.

EXAMPLE 9

This example shows that the hydrochloride salt of Example 1 has marked aphicidal properties at a concentration in water of less than 60 parts per million.

A portion of the pesticidal composition of Example 8 was diluted with three times its weight of water (containing 0.05% of the wetting agent of Example 7). The composition obtained was then sprayed upon broad bean plants infested with aphids (*M. pisi*), and 2 days after the spraying it was found that a 100% kill of the aphids had been obtained. In the above test the composition showed no phytotoxic properties.

EXAMPLE 10

This example describes a pesticidal composition containing as active ingredient the product of Example 2.

A pesticidal composition was obtained following the procedure of Example 7, but using 4 parts of the product of Example 2 instead of the base of Example 1. Broad bean plants infested with *M. pisi* were sprayed with the composition, and 2 days after spraying it was found that 100% kill of the aphids had been obtained. In this test the composition showed no phytotoxic properties.

EXAMPLE 11

This example describes a pesticidal composition containing as active ingredient the product of Example 4.

A pesticidal composition was obtained following the procedure of Example 7, but using 16 parts of the product of Example 4 in place of the base of Example 1. The composition was sprayed upon broad bean plants infested with aphids (*M. pisi*), and 2 days after spraying it was found that 100% kill of the aphids had been obtained. In a second test the composition was used to spray French bean plants infested with red spider mites (*T. telarius*) and 3 days after spraying a 100% kill of the mites had been obtained. In these tests the composition showed no phytotoxic properties.

EXAMPLE 12

This example shows that the product of Example 4 has marked acaricidal properties at a concentration in water as low as 16 parts per million.

A portion of the pesticidal composition of Example 11 was diluted with ten times its weight of water (containing 0.05% of the wetting agent of Example 7). The composition thus obtained was used to spray French bean plants infested with red spider mites (*T. telarius*) and 3 days after spraying it was found that 100% kill of the mites had been obtained.

EXAMPLE 13

This example describes a pesticidal composition containing as active ingredient the picrate salt of Example 6.

A pesticidal composition was prepared following the procedure of Example 7, but using 10 parts of the picrate of Example 6 instead of the base of Example 1. The composition was sprayed upon French bean plants which had been infested with red spider mites (*T. telarius*), and 3 days after spraying it was found that 100% kill of the mites had been obtained. In this test the composition showed no phytotoxic properties.

The parathion equivalents of the compounds of Examples 1–6 have been obtained as follows:

Each of the compounds was tested in the form of a number of aqueous solutions covering a range of concentrations, and each containing 0.5% by weight of the wetting agent described in Example 7. Similar aqueous solutions of various concentrations of the commercial pesticide parathion were used as a standard for comparison.

The method of testing against *M. pisi* was as follows:
Adult, apterous, viviparous females were sprayed under a Potter Tower apparatus with 2 cc. of each of the aqueous solutions of the test chemical and of parathion, three replicates of 30–40 aphids being used with each solution. After being sprayed, the aphids were transferred to 2-oz. bottles containing clean broad bean leaves, which were then stored under conditions of constant temperature and humidity for 24 hours, at the end of which time the number of dead aphids was counted and the LD 50 value calculated.

With *T. telarius* the method of testing was as follows:
Small French bean plants in 3″ pots were infested with adult female mites, and 24 hours later were sprayed on a turntable with one of the aqueous solutions. In each instance the spray was applied until excess of the solution ran off the plant. The plants were then stored in a heated greenhouse for 3 days, and at the end of that period the number of dead mites was counted and the LD 50 value calculated.

The results obtained from the tests described above are set out below in Tables 1 and 2. Table 1 gives the parathion equivalent of the mroe active compounds tested. Table 2, contains the results obtained for the less active compounds, and gives the minimum concentration at which the various test compounds killed 100% of the aphids or mites in the tests described above.

*Table 1*

| Compound of Example No. | Form of compound | Parathion Equivalent | |
|---|---|---|---|
| | | M. *p.i.s.i.* | *T. telarius* |
| 1 | Base | 3.6 | 0.4 |
| 2 | do | 2.6 | Not tested |
| 3 | do | 2.2 | |
| 4 | do | 3.1 | 2.3 |
| 6 | Picrate | 0.5 | |

*Table 2*

| Compound of Example No. | Form of Compound | Minimum concentration (p.p.m.) giving 100% kill | |
|---|---|---|---|
| | | *M. pissi* | *T. telarius* |
| 1 | Hydrochloride | 40 | 100 |
| 3 | Base | | 500 |
| 5 | do | 160 | |
| 6 | Picrate | | 100 |

What we claim is:
1. A compound selected from the group consisting of an s-triazine derivative of the formula:

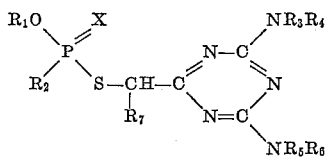

wherein $R_1$ and $R_2$ are selected from the group consisting of methyl and ethyl; $R_3$ is selected from the group consisting of hydrogen, methyl, ethyl, propyl, butyl and the atoms necessary to complete a piperidino ring with $R_4$ and the adjacent nitrogen atom; $R_4$ is selected from the group consisting of hydrogen, methyl, ethyl, propyl, butyl and the atoms necessary to complete a piperidino ring with $R_3$ and the adjacent nitrogen atom; $R_5$ is selected from the group consisting of hydrogen, methyl, ethyl, propyl, butyl and the atoms necessary to complete a piperidino ring with $R_6$ and the adjacent nitrogen atom; $R_6$ is selected from the group consisting of hydrogen, methyl, ethyl, propyl, butyl and the atoms necessary to complete a piperidino ring with $R_5$ and the adjacent nitrogen atom; $R_7$ is selected from the group consisting of hydrogen, methyl, ethyl, propyl and butyl; and X is selected from the group consisting of oxygen and sulphur, and its acid addition salts.

2. 2-ethoxy(methyl)-phosphinylthiomethyl-4:6 - diamino-s-triazine.

3. 2-α-ethoxy(methyl)phosphinylthioethyl-4:6 - diamino-s-triazine.

4. 2-ethoxy(methyl)phosphinylthiomethyl-4 - amino-6-methylamino-s-triazine.

5. 2-ethoxy-(methyl)-phosphinylthiomethyl - 4-amino-6-dimethylamino-s-triazine.

6. 2-ethoxy-(methyl)-phosphinylthiomethyl - 4:6 - bis-methyl-amino-s-triazine.

7. 2-ethoxy(methyl)phosphinylthiomethyl-4 - amino-6-piperidino-s-triazine.

(References on following page)

References Cited in the file of this patent

UNITED STATES PATENTS

| | | |
|---|---|---|
| 2,368,451 | D'Alelio | Jan. 30, 1945 |
| 2,619,486 | Erickson | Nov. 25, 1952 |
| 2,758,115 | Lorenz | Aug. 7, 1956 |
| 2,767,194 | Fancher | Oct. 16, 1956 |
| 2,802,855 | Whetstone et al. | Aug. 13, 1957 |
| 2,822,364 | Schuller | Feb. 4, 1958 |
| 2,843,588 | Lorenz | July 15, 1958 |
| 2,865,912 | Pohlemann et al. | Dec. 23, 1958 |
| 2,881,201 | Schrader | Apr. 7, 1959 |
| 2,887,432 | Baker et al. | May 19, 1959 |
| 2,902,493 | Lorenz et al. | Sept. 1, 1959 |
| 2,907,787 | Hoffmann et al. | Oct. 6, 1959 |
| 2,911,337 | Uhlenbrock et al. | Nov. 3, 1959 |
| 2,914,530 | Schroder et al. | Nov. 24, 1959 |
| 2,976,207 | Little et al. | Mar. 21, 1961 |
| 2,980,675 | Schwarze | Apr. 18, 1961 |
| 3,011,998 | D'Alelio | Dec. 5, 1961 |
| 3,035,079 | Beriger | May 15, 1962 |

FOREIGN PATENTS

| | | |
|---|---|---|
| 713,278 | Great Britain | Aug. 11, 1954 |
| 1,135,848 | France | May 3, 1957 |

OTHER REFERENCES

Frear et al.: Journ. of Econ. Entomology, vol. 40, pages 736–41 (1947).

Derwent Belgian Report No. 53A, page C 14, (May 31, 1959). An abstract of Belgian Patent No. 572,314, published April 30, 1959).